Sept. 27, 1927.  
E. J. JAKUBIAK  
LIGHT SUPPORT  
Filed Aug. 30, 1926  
1,643,455  
2 Sheets-Sheet 1
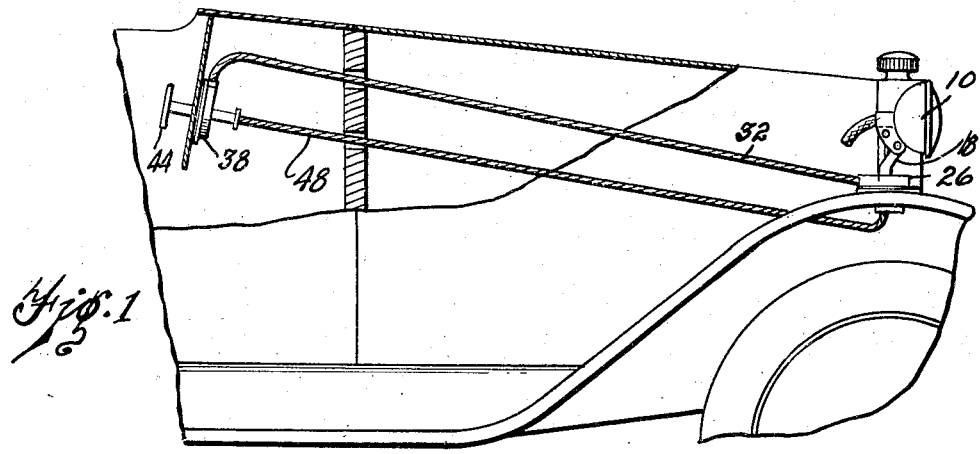
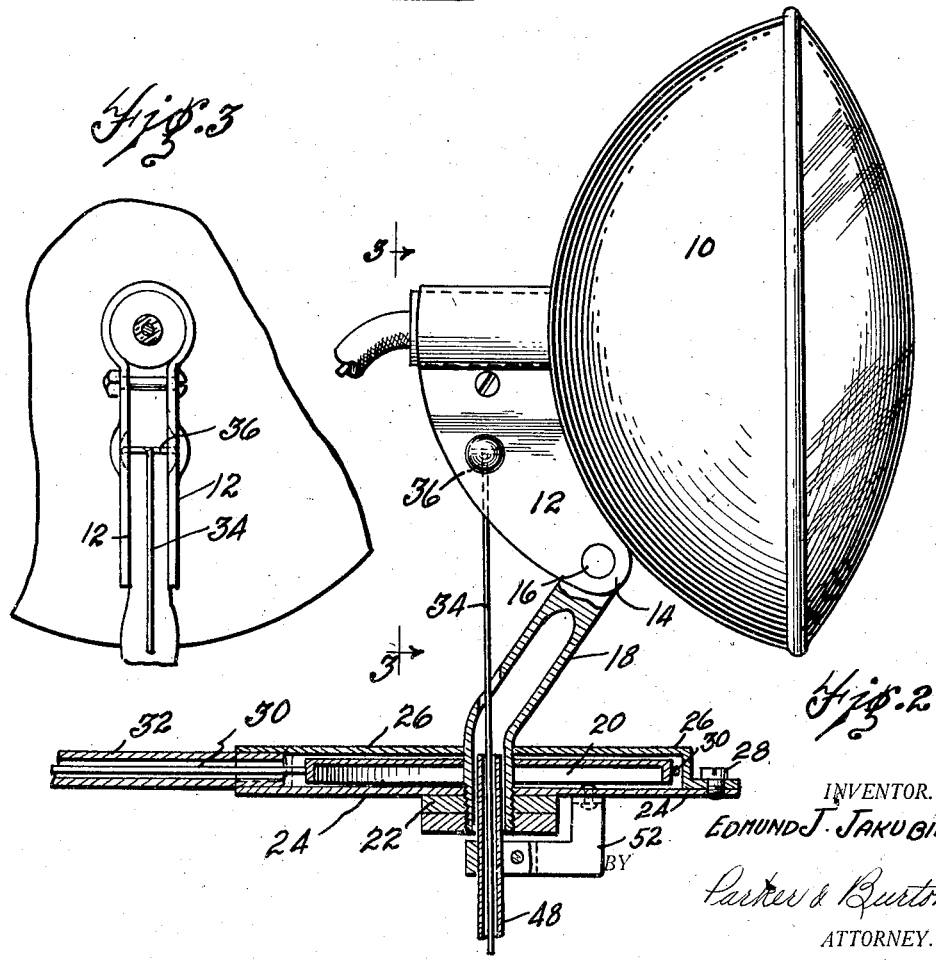
INVENTOR.  
Edmund J. Jakubiak  
BY Parker & Burton  
ATTORNEY.

Sept. 27, 1927.      E. J. JAKUBIAK      1,643,455
LIGHT SUPPORT
Filed Aug. 30, 1926      2 Sheets-Sheet 2
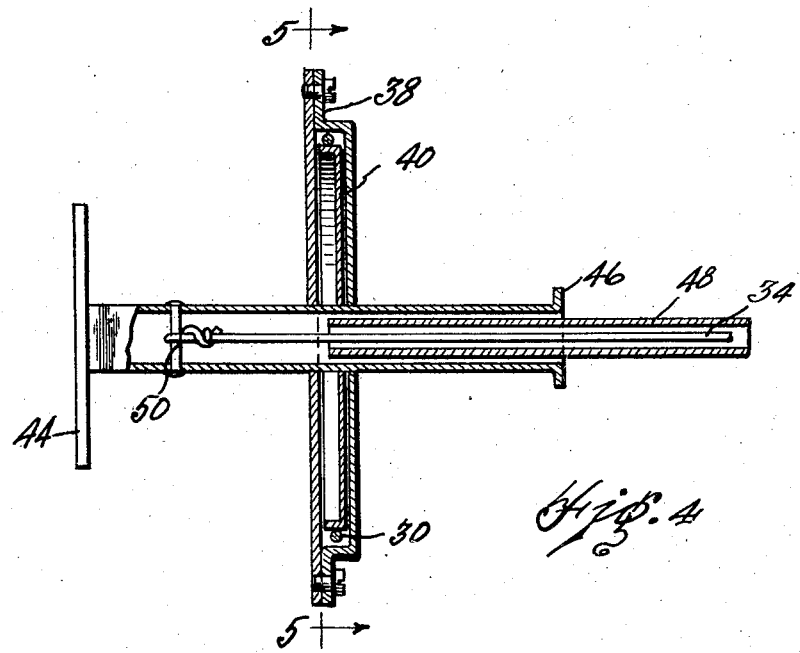
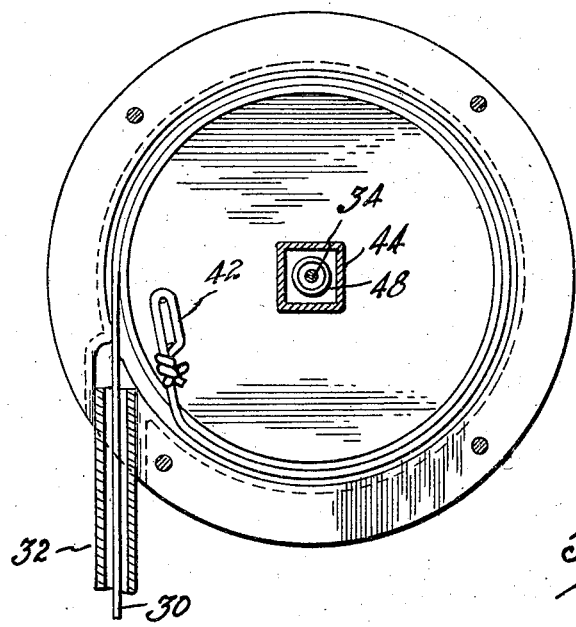
INVENTOR.
EDMUND J. JAKUBIAK
BY
Parker & Burton
ATTORNEY.

Patented Sept. 27, 1927.

1,643,455

UNITED STATES PATENT OFFICE.

EDMUND J. JAKUBIAK, OF DETROIT, MICHIGAN.

LIGHT SUPPORT.

Application filed August 30, 1926. Serial No. 132,457.

My invention relates to improvements in light supports whereby a light is so mounted as to be capable of substantially universal movement within a determined range.

The invention resides in an improved support and means for swinging the light through relatively angularly disposed planes so as to direct its rays as desired. It is embodied in a spot light structure intended particularly for use on motor vehicles and consists in an improved support for the light casing and improved mechanism whereby the light may be pivotally actuated relative to its support and whereby the support may be pivotally actuated to swing the light at an angle to its permitted pivotal movement independently of the support.

The structure employed is simple, inexpensive, easily operable and comprises a minimum number of operating parts and is particularly well adapted for the specific use for which this light is primarily adapted.

The several specific novel features and meritorious advantages thereof will more fully appear from the following description of the illustrative embodiment shown in the accompanying drawings and defined in the appended claims.

In the drawings:

Fig. 1 is a fragmentary elevation partly in section of a motor vehicle equipped with my improved light structure.

Fig. 2 is a fragmentary elevation of the light with the support shown partly in cross section.

Fig. 3 is a sectional view taken on line 3—3 of Fig. 2.

Fig. 4 is a cross-sectional view through a portion of my light structure.

Fig. 5 is an elevation partly in section taken on line 5—5 of Fig. 4.

My invention pertains to an improved support and its operating mechanism particularly adapted to carry a spot light of conventional type. The light is here shown, for purpose of illustration, as supported upon one fender of a motor vehicle. Obviously it might be supported at any suitable location.

The light proper or the light casing is indicated by the numeral 10. This casing has a rearwardly projecting bracket 12, which bracket has a part 14 swiveled upon a pin 16 carried by the forked end of a hollow supporting arm 18. The arm 18 is carried by a pulley wheel disk 20. It is secured axially to the disk and projects angularly therefrom. Rotation of the disk swings the arm and with it the light casing 10.

The arm extends below the disk and adjusting nuts 22 are threaded thereon to hold it in place. The disk is mounted within a casing consisting of two sections 24 and 26 which are secured together in any suitable manner as by screws 28. The disk is supported upon one horizontal face for rotation so that its rotation is counter the frictional resistance thereof.

A pulley cord 30 encircles the disk and is secured at one end thereto. This cord is preferably formed of a flexible wire possessing considerable rigidity so that the disk may be rotated in either direction upon application of force to the wire. This wire passes through a suitable housing or conduit 32 which extends tangentially from the casing.

A second flexible wire extension 34 has a universal pivotal connection 36 with the light casing bracket. This connection may be formed by providing a socket in the bracket 12 and forming a knot on the end of the wire 34 which knot is mounted loosely within the socket. This forms an inexpensive and satisfactory type of ball and socket connection.

Upon the instrument board or at any other suitable location within the car convenient to the manipulation of the driver, there is mounted a casing 38 similar in construction to the casing 26 heretofore described. Within this casing 38 is rotatably mounted a pulley wheel disk 40 which resembles in construction the pulley wheel disk 20 heretofore described. The conduit 32 enters the casing 38 tangentially as it leaves the casing 26 and the flexible extension 30 encircles the pulley wheel disk 40 and is secured thereto as at 42 in a manner similar to that in which the opposite end thereof is secured to the pulley wheel disk 20.

A convenient means of attaching the connection to the disk is to punch up an ear from the disk to which the connection can be fastened.

A handle 44 extends axially through the disk 40. Upon rotation of the handle the disk is likewise rotated. The handle is axially slidable through the disk. At one end it has a shoulder 46 which serves as a stop. The flexible connection 34 extends through the hollow arm 18 and axially through the disk 20 and then passes through a suitable protective housing 48, which housing enters the hollow shaft of the handle 44. The flexible connection 34 is secured at 50 to the handle 40.

It will now appear that upon rotation of the handle the disks 40 and 20 will be rotated by the flexible extension 30. Rotation of the disk 20 will swing the arm 18 and with it the light casing 10 through a horizontal plane. Axial movement of the handle 44 will withdraw or project the extension 34 and thereby swing the light casing 10 upon its pivotal mounting 16 on the arm 18 through a vertical plane. The light casing 10 may therefore be swung either horizontally or vertically upon rotation or upon axial movement of the handle 44. The light casing is supported by the arm 18 upon the disk 20 so that the frictional resistance of such disk to rotation serves to support the light at any positions to which it has been adjustably actuated.

Through adjustment of the nut 22, the disk 20 can be drawn into close contact with the bottom of the casing increasing the frictional resistance thereof. A bracket arm 52 extends from the casing to the housing 48 to support the same.

What I claim is:

1. In a light supported for substantially universally adjustable movement over a given range, a light casing, a support therefor comprising a disk mounted within a casing upon one face for rotation counter the frictional resistance thereof, a casing about said disk having a part supporting said disk for rotation thereover, said disk provided with an axial extension, said light casing pivotally supported upon said extension, a cable wound about said disk to rotate the same in either direction, counter the frictional resistance of the face upon which it is supported, a second cable extending axially through said disk to the light casing to swing the same independently of its support upon the disk.

2. In a light supported for substantially universally adjustable movement over a given range, a light casing, a support therefor comprising a rotatably mounted disk having an angular axial extension, a light casing pivoted to said extension for independent swinging movement and adapted to swing therewith as the disk is rotated, a second disk, a handle to rotate said second disk, said handle slidable axially through said second disk, a cable extending from said handle through the first disk and the axial extension thereof to the light casing to swing the same independently of said first disk and a second cable connecting said disks for rotation.

3. In a vehicle spot light supported for adjustable movement, a support therefor comprising a pulley wheel disk rotatably mounted within a casing and provided with an angularly projecting axial extension, a light casing pivotally supported upon said extension, a second disk rotatably supported within a casing, a handle to rotate said second disk, said handle being axially slidable through said second disk, a cable extending from one disk to the other and wound about both disks whereby upon rotation of the one disk the other disk is likewise rotated, a second cable extending from the handle axially through both disks to the light casing to actuate the same upon longitudinal movement thereof.

4. In a light of the character described, a light reflector casing provided with an axial extension, a sheath folded over said extension provided with a pair of spaced apart wings disposed radially with respect to the light casing, a support for the casing comprising a pulley wheel disk provided with an angularly axial extension pivotally articulated with the wings of said sheath to support the casing to rotate with the disk or for swinging movement independently thereof, a cable wound about said disk to rotate the same, a second cable extending axially through said disk and through its extension and terminating in a ball positioned between said wings, said wings provided with a socket to support said ball.

5. In a light of the character described, a light structure, a pulley wheel disk rotatably supported within a casing upon one face for rotation counter the frictional resistance of said face, said disk provided with an axial extension, adjustable means engaging said extension to increase or decrease the frictional resistance of rotation of said disk within the casing, said light structure pivotally supported upon said axial extension of the disk for rotation therewith and for swinging movement thereon, a second pulley wheel disk mounted within a casing, a cable connecting said disks together and wound about each, a handle for said second disk extending axially slidably therethrough but connected therewith to rotate the disk and a cable extending from said handle through both disks to the light structure.

6. In a light of the character described, a light casing having an axial extension, a sheath folded over said extension and providing a pair of spaced apart wings secured to the casing and extending radially thereover outwardly toward its margin, a support including a rotatably mounted element provided with an axial extension pivotally articulated between said wings, and an operating member having a universal pivotal connection said wings above the point of articulation of said axial extension therewith.

In testimony whereof, I, EDMUND J. JAKUBIAK, sign this specification.

EDMUND J. JAKUBIAK.